W. J. DUNHAM.
LAND ROLLER OR PULVERIZER.
APPLICATION FILED MAR. 8, 1915.
Reissued June 1, 1915. 13,921.
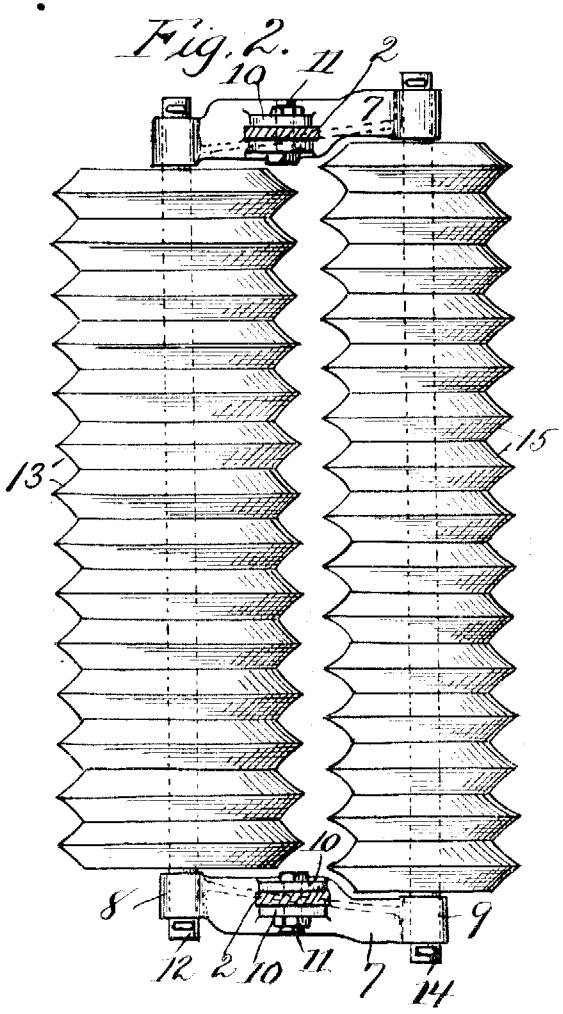
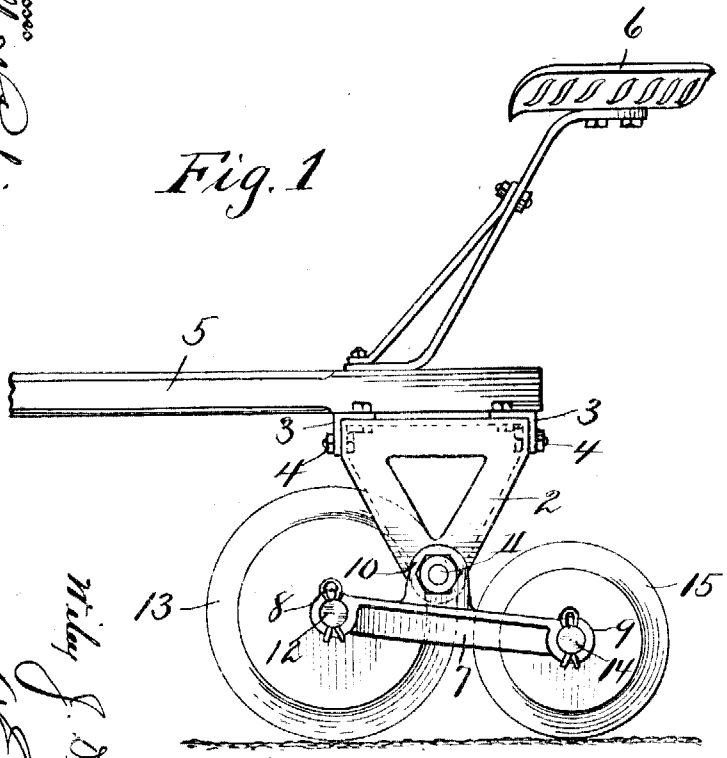
Witnesses
Albert Perkins
Ernest Bey
Inventor
Wiley J. Dunham
By
A. E. Merkel,
Attorney

UNITED STATES PATENT OFFICE.

WILEY JULIUS DUNHAM, OF BEREA, OHIO, ASSIGNOR TO THE DUNHAM COMPANY, OF BEREA, OHIO, A CORPORATION OF OHIO.

LAND ROLLER OR PULVERIZER.

13,921. Specification of Reissued Letters Patent. Reissued June 1, 1915.

Original No. 1,094,201, dated April 21, 1914, Serial No. 661,538. Application for reissue filed March 8, 1915. Serial No. 13,035.

*To all whom it may concern:*

Be it known that I, WILEY JULIUS DUNHAM, a resident of Berea, in the county of Cuyahoga and State of Ohio, have invented a new and useful Improvement in Land Rollers or Pulverizers, of which the following is a full, clear, and exact description, reference being had to the accompanying drawings, forming part of this specification, in which—

Figure 1 is an end view of one form of land roller built in accordance with my invention, and Fig. 2 is a sectional plan view of the same.

This invention relates to land rollers or pulverizers and is designed to provide a cheap and efficient device of this character, which is provided with two parallel rollers, which are arranged to oscillate, so that both of the rollers will be in contact with the ground when going over uneven surfaces.

The precise nature of my invention will be best understood by reference to the accompanying drawings which will now be described, it being premised, however, that various changes may be made in the details of construction and general arrangement of the parts, without departing from the spirit and scope of my invention, as defined in the appended claims.

In the drawings, the numeral 2 designates the end members of the main frame of the roller, which end members are connected to each other by means of the longitudinally extending angle irons or cross-bars 3—3. These angle irons or cross-bars are connected to the flanges of the end members 2 by means of bolts 4, and connected to the angle irons 3 is a tongue 5 on which is mounted the usual driver seat 6.

Pivotally mounted to the lower end of each of the end members 2 is a rocking frame 7, each of which frames is provided at its ends with journals 8 and 9. The rocking frames 7 are provided with upwardly extending lugs 10—10 in front of the center between the journals 8 and 9, which are arranged to receive the downwardly extending ends of the members 2 of the main frame, and 11 are bolts extending through the lower ends of the member 2 and the projections 10, on which the rocking frames are arranged to oscillate. Mounted in the journals 8—8 of the rocking frames 7 is a shaft 12 on which are journaled a plurality of pulverizer disks 13 which form the front roller. Mounted in the journals 9—9 of the rocking frames 7 is a shaft 14 on which are journaled a plurality of pulverizer disks 15, which are somewhat smaller in diameter than the disks 13 and these disks form the rear roller. The pivoting of the rocking frames to the main frame at the point in front of the middle thereof brings the center of the disks 13 closer to their pivotal connection with the main frame, so that a greater load is placed on these front disks than is placed on the rear disks. This is a decided advantage as the front roller has the heaviest crushing to do and therefore the weight thereon should be greater than the weight on the rear roller. Furthermore, there is a decided advantage in the placing of the larger disks in front of the smaller disks and the pivoting of the frame carrying the disks at points between vertical planes passing through the axes of the shafts supporting respectively the front and rear disks. By this arrangement the weight of the frame and the parts carried thereby, as well as the driver, is advantageously applied to the front disks, which take the initial and hence the most difficult part of the pulverizing operation. Then, again, the end members are pivoted to upwardly extending lugs carried by the rocking frames and this placing of the axis of oscillation above the plane which passes through the two axes of the shafts causes the front disks to dig somewhat deeper as the pull exerted upon the secondary frame is not exactly in line with the axis of the front disks but above the same.

Having thus described my invention, what I claim as new and desire to secure by Letters Patent, is:

1. A land roller having a main frame, a rocking frame, an axle mounted in the rear end of the rocking frame, a second axle mounted in the front end of said rocking frame, roller disks mounted on each of said axles, and means for connecting the rocking frame to the main frame to place the greatest weight on the roller disks on the front axle, substantially as described.

2. A land roller having a main frame, a rocking frame pivotally connected to each end of the main frame, said rocking frames being connected to the main frame in front of the center thereof, an axle mounted in the rear ends of both rocking frames, a second axle mounted in the front ends of both of said rocking frames, a plurality of roller disks mounted on the rear axle, and a plurality of roller disks mounted on the front axle, the roller disks on the front axle being of larger diameter than the roller disks on the rear axle, substantially as described.

3. In a land roller, the combination of a main frame consisting of cross-bars and two downwardly projecting end members, a secondary frame pivotally mounted on each end member so as to freely oscillate thereon, two parallel shafts mounted in said secondary frames, a plurality of pulverizer disks mounted on the forward shaft, a plurality of pulverizer disks of smaller diameter than said first named disks mounted upon the rear shaft, the axis of oscillation of said secondary pivoted frames being located between vertical planes passing through the axes of said shafts.

4. In a land roller, the combination of a main frame consisting of cross-bars and two downwardly projecting end members, two secondary frames, each secondary frame having an upwardly projecting lug pivotally connected to the respective end member, two parallel shafts mounted in said secondary frames in a plane below the pivotal connection between said frames and the end members, a plurality of pulverizer disks mounted upon the forward shaft, a plurality of pulverizer disks of smaller diameter than said first named disks mounted upon the rear shaft, the axis of oscillation of the secondary pivoted frames being vertical planes passing through the axes of said shafts.

In testimony whereof, I affix my signature, in presence of two witnesses.

WILEY JULIUS DUNHAM.

Witnesses:

I. E. Furry,

J. B. Dunham.

Correction in reissue Letters Patent No. 13,921.

It is hereby certified that in reissue Letters Patent No. 13,921, granted June 1, 1915, upon the application of Wiley Julius Dunham, of Berea, Ohio, for an improvement in "Land Rollers or Pulverizers," an error appears in the printed specification requiring correction as follows: Page 2, line 38, after the word "being" insert the word *between;* and that the said Letters Patent should be read with this correction therein that the same may conform to the record of the case in the Patent Office.

Signed and sealed this 29th day of June, A. D., 1915.

[SEAL.]

J. T. NEWTON.

*Acting Commissioner of Patents.*